United States Patent [19]

Mehl et al.

[11] Patent Number: 4,481,459
[45] Date of Patent: Nov. 6, 1984

[54] COMBINED STARTING/GENERATING SYSTEM AND METHOD

[75] Inventors: Byron R. Mehl, Belvidere; Raymond N. Olson; Timothy F. Glennon, both of Rockford, all of Ill.

[73] Assignee: Sundstrand Corporation, Rockford, Ill.

[21] Appl. No.: 563,449

[22] Filed: Dec. 20, 1983

[51] Int. Cl.³ .................... F02N 11/04; F02N 11/08
[52] U.S. Cl. ................................. 322/10; 290/38 R; 290/46; 322/29
[58] Field of Search ................... 322/10, 11, 28, 29; 290/38 R, 46

[56] References Cited

U.S. PATENT DOCUMENTS

| 3,809,914 | 5/1974 | Kilgore et al. | 322/29 X |
| 3,908,130 | 9/1975 | Lafuze | 290/38 R X |
| 3,908,161 | 9/1975 | Messenger | 322/29 |
| 4,330,743 | 5/1982 | Glennon | 322/10 |

Primary Examiner—R. J. Hickey
Attorney, Agent, or Firm—Wood, Dalton, Phillips, Mason & Rowe

[57] ABSTRACT

A power conversion system for converting between electric and motive power may be utilized either in a generating mode to generate electric power from motive power supplied by a prime mover or in a starting mode wherein motive power is developed by the power conversion system from electrical power and is supplied through a torque converter to the prime mover to start same. The power conversion system includes a main generator, an exciter and a permanent magnet generator, or PMG, which together comprise a brushless alternator. When operated in the starting mode, power is supplied to the PMG to cause it to act as a motor and thereby drive a rotor which is common to the PMG, exciter and main generator. Once a predetermined operating condition of the generator is attained, the main generator is supplied power from a motor control to cause the generator to act as a synchronous motor and the power supply to the PMG is disconnected. The torque converter is then commanded to transfer motive power from the generator to the prime mover to start same.

14 Claims, 9 Drawing Figures

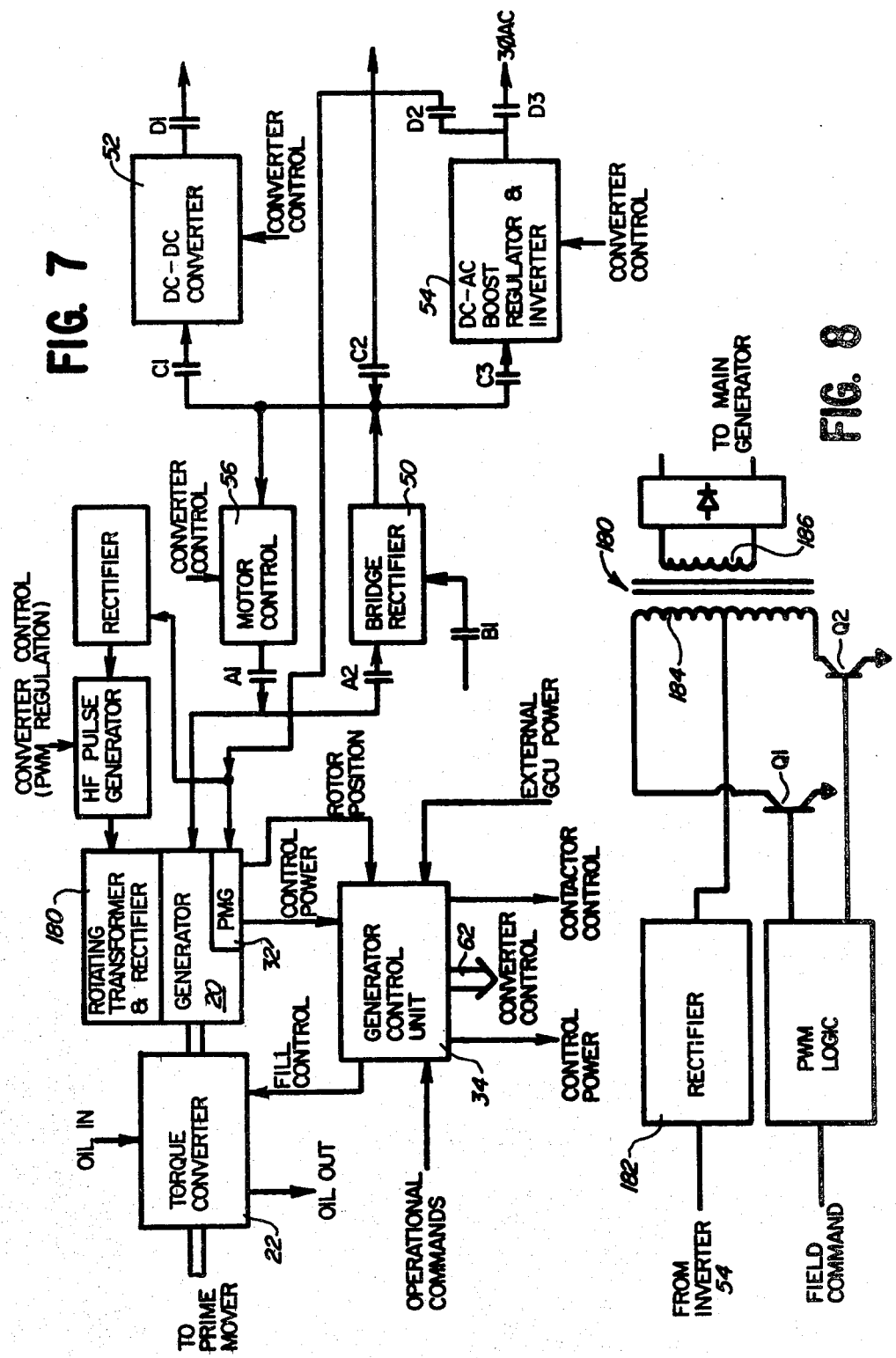

COMBINED STARTING/GENERATING SYSTEM AND METHOD

DESCRIPTION

1. Technical Field

The present invention relates generally to dynomoelectric power conversion apparatus, and more particularly to a generating system which may be utilized to start a prime mover.

2. Background Art

There have been various attempts to eliminate the necessity of a starter motor to start a prime mover which drives a generating system. One such attempt is disclosed in Hoffmann et al U.S. Pat. No. 4,093,869. This patent discloses generating apparatus in the form of a pilot exciter, a main exciter and a main generator all of which are coupled to a prime mover. In a generating mode, the pilot exciter provides field current for the main exciter, which in turn generates field current for the main generator. When it is desired to utilize the generating apparatus to start the prime mover, a quadrature axis winding disposed about the stator of the main exciter is energized by single-phase alternating current. A corresponding alternating current is induced by transformer action within the armature of the exciter and is utilized to supply main generator field current. At the same time, polyphase alternating current excitation is applied to the armature of the main generator to establish a rotating magnetic field which interacts with the static magnetic field set up by the field current in the main generator. This interaction produces a mechanical turning force which is utilized to start the prime mover.

Messenger U.S. Pat. No. 3,908,161 discloses a generating system wherein a three-phase alternating voltage is applied to a set of exciter field windings which are connected in a wye configuration. The exciter operates as a rotating transformer, with the armature current of the exciter being rectified and applied to the field winding of the main generator to cause the main generator to operate as a motor and thereby start a prime mover. Once the prime mover has been started, the rotating transformer is converted back to a brushless exciter by connecting the field windings in series and applying a DC voltage thereto from the output of a permanent magnet generator, or PMG.

Other patents which disclose systems similar to the Messenger device include Lafuze U.S. Pat. Nos. 3,902,073, 3,908,130 and 3,937,974.

Each of the systems described above suffers from disadvantages. The Hoffmann et al system requires that a separate additional quadrature axis winding be disposed in the exciter stator, such winding being utilized only when the system is operated in the starting mode. The Messenger and Lafuze patents require that the exciter stator windings be switched from a series connection to a wye connection when it is desired to utilize the main generator to start the prime mover.

A further device which eliminates the necessity for a starter motor is disclosed in Glennon U.S. Pat. No. 4,330,743, which is assigned to the assignee of the instant application. A reversible AC-to-DC converter receives external DC power and supplies AC power to drive an alternator as a motor to start a prime mover connected thereto.

This system requires sophisticated current control circuits to handle the large currents that must be delivered to the alternator to cause it to act as a motor. Furthermore, in the event that the alternator is a wound field machine, the field windings must be switched to a different configuration to allow it to operate as an induction motor.

DISCLOSURE OF INVENTION

In accordance with the present invention, a preferred embodiment of a power conversion system for converting between electrical and motive power having a combined electromagnetic structure comprising a permanent magnet generator, or PMG, an exciter and a main dynamoelectric machine dispenses with the need for separate additional field windings in the exciter, switching means for switching field windings of the exciter between different configurations and complex current control circuitry.

In a dynamoelectric power conversion system which converts between motive power and electrical power, a common rotor of the PMG, exciter and main machine are coupled to a prime mover through a torque converter. When the power conversion system is operated in a starting mode, the PMG is coupled to a source of electrical power to cause the PMG to operate as a motor and drive the common rotor. The PMG continues to operate as a motor until a predetermined operating condition of the main machine is attained, at which point the source of electrical power is disconnected from the PMG and electrical power is applied to the main machine to cause the main machine to operate as a synchronous motor. After this synchronous operation is achieved, the torque converter may be commanded to transfer power from the main machine to the prime mover to start the latter. Once the prime mover is started, it drives the main machine by overrunning the torque converter. At this point, the power conversion system is switched to a generating mode to develop electrical power from the motive power developed by the prime mover.

BRIEF DESCRIPTION OF THE DRAWINGS

FIG. 7 is a block diagram of an alternative dynamoelectric power conversion system according to the present invention; and FIG. 8 is a combined schematic and block diagram of the rotating transformer and high frequency pulse generator shown in block diagram form in FIG. 6.

BEST MODE FOR CARRYING OUT THE INVENTION

Figure 1:
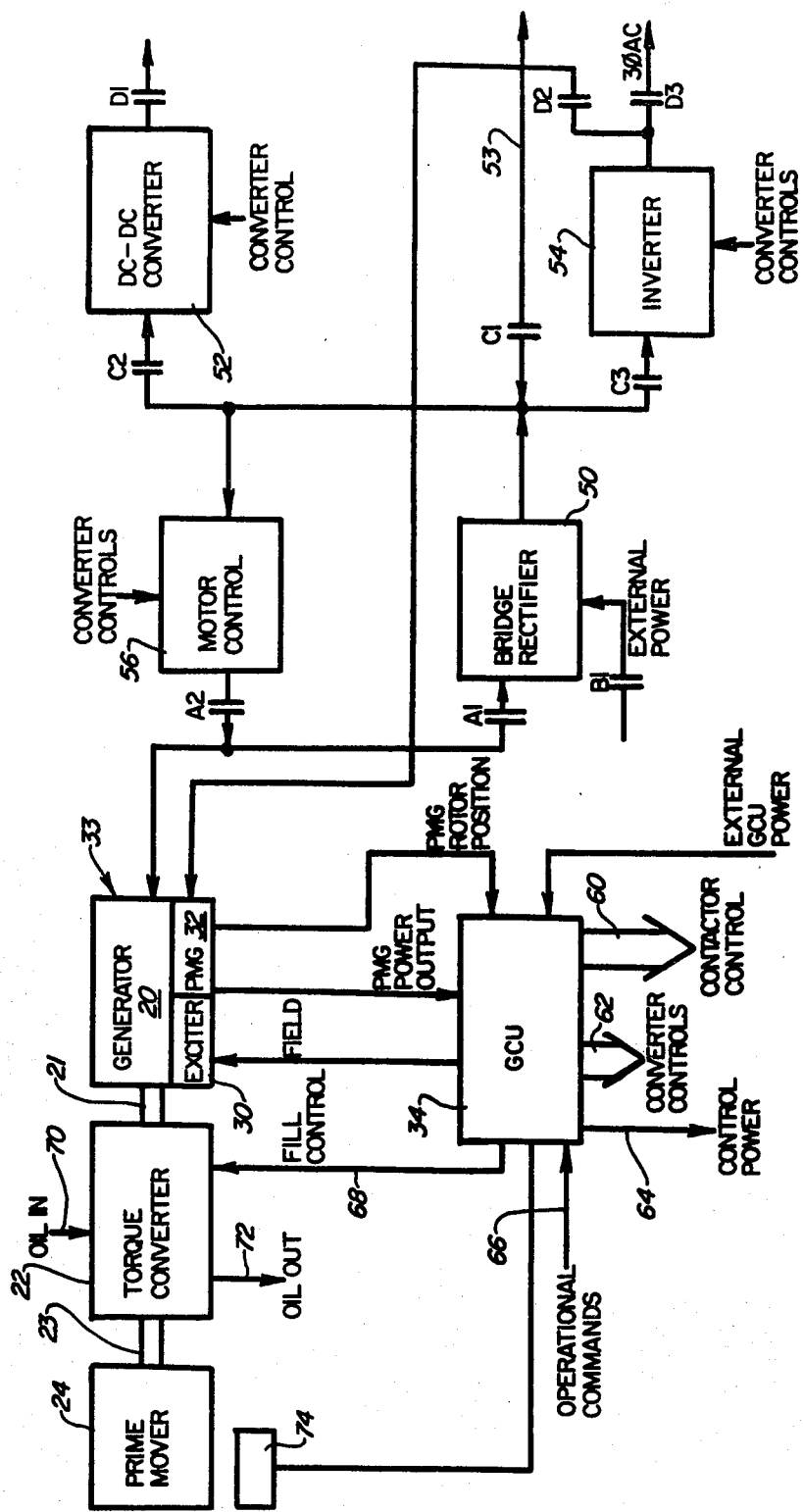
FIG. 1 is a block diagram of a dynamoelectric power conversion system according to the present invention.

Referring now to FIG. 1, a dynamoelectric power conversion system includes a main dynamoelectric machine in the form of a generator 20 which is coupled through a shaft 21, a torque converter 22 and a second shaft 23 to a prime mover 24.

Figure 2:
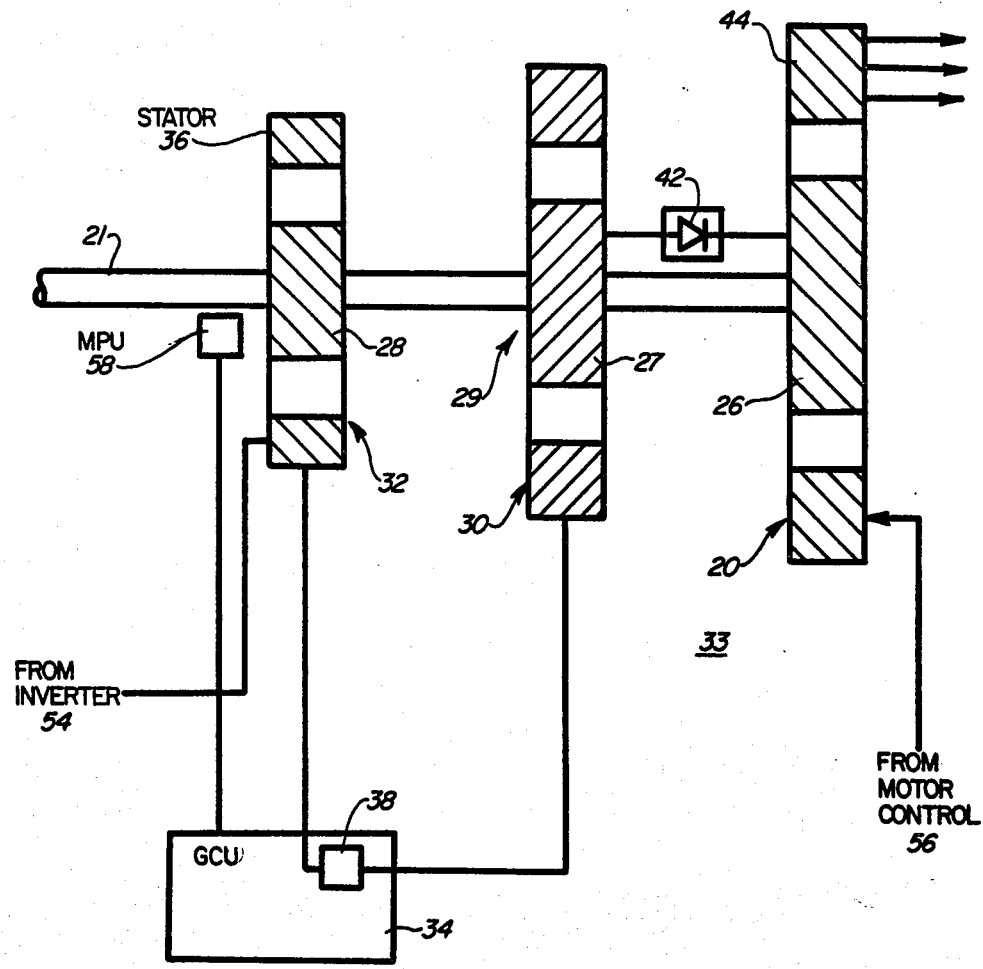
FIG. 2 is a schematic diagram of the generator, exciter, permanent magnet generator and generator control unit shown in block diagram form in FIG. 1.

As seen in FIG. 2, the shaft 21 is mechanically linked to each of three rotor structures 26–28 of the generator 20, an exciter 30 and a permanent magnet generator, or PMG 32. The three rotor structures 26–28 together comprise a common rotor 29 for a combined electromagnetic structure 33 consisting of the generator 20, exciter 30 and PMG 32.

It should be noted that some or all of the PMG, exciter and generator rotors may be mechanically linked by shafts, gears, or other forms of linkages, as desired.

The combined electromagnetic structure 33 is controlled by a generator control unit, or GCU 34 to operate in either a generating mode, wherein electrical power is derived from motive power supplied by the prime mover 24 and the torque converter 22, or a starting mode to provide motive power to the prime mover 24 through the torque converter 22 from electrical power supplied by an external source.

When the combined electromagnetic structure 33 operates in the generating mode, motive power is supplied through the shaft 21, in turn causing the common rotor 29 to rotate relative to a stator 36 of the PMG 32. An alternating voltage is developed in windings within the stator 36, with this voltage being regulated by a voltage regulator 38 in the GCU 34. The output from the regulator 38 is coupled to field windings in a stator 40 of the exciter 30. Rotation of the exciter rotor structure 27 within the magnetic field set up by the current in the windings of the exciter stator 40 causes generation of AC power which is rectified by a rotating rectifier circuit 42. The rectified power is applied to field windings in the main machine rotor structure 26 to set up a main machine magnetic field which rotates relative to windings in a stator 44 of the generator 20. The windings in the stator 44 develop polyphase AC power. This AC power may be sensed by the GCU 34 to control main generator field excitation and thereby maintain the generator output at a controlled value.

Referring again to FIG. 1, the polyphase output from the generator 20 is coupled through a contactor A1 to a bridge rectifier circuit 50 which converts the AC power into DC power of a specified level, such as 270 volts DC. This power may be coupled through a contactor C1 to an output device and through contactors C2 and C3 to a DC-to-DC converter 52 and a DC-to-AC inverter 54. The DC-to-DC converter 52 converts the 270 volt DC to 28 volt DC which is coupled through a contactor D1 to an output device. The inverter 54 develops 400 hertz three-phase AC power which is connected through a contactor D3 to an output device.

The inverter 54 is also coupled through a contactor D2 to the stator windings of the PMG 32 to operate the PMG as a motor, as noted more specifically below.

It should be noted that the inverter need not have a large current-handling capability in order to perform this function, and hence the present invention may be utilized with those systems designed to supply a high proportion of DC loads as compared with AC loads.

The bridge rectifier 50 receives external AC power through a contactor B1. The output of the rectifier 50 is coupled to a motor control circuit 56, the output of which is connected through a contactor A2 to the windings in the generator stator 44.

The GCU 34 senses the position of the common rotor by means of a magnetic pickup unit or MPU 58 or some other means of sensing rotary position shown schematically in FIG. 2. This position sensing is utilized in the starting mode, as noted more specifically hereinafter.

The GCU controls various devices in the system shown in FIG. 1. For example, the contactors A1, A2, B1, C1–C3 and D1–D3 are all controlled over a series of lines 60 while the DC-to-DC converter 52, inverter 54 and motor control 56 are controlled over a series of lines 62. In addition, power for the various components of the system is provided over lines 64.

The GCU 34 controls the operational mode of the combined electromagnetic structure 32 in either the starting mode or the generating mode in accordance with an operational command over a line 66.

The torque converter 22 is controlled by the GCU 34 over a fill control line 68 to control the transference of motive power between the combined electromagnetic structure 33 and the prime mover 24. The GCU accomplishes this function by controlling the admittance or escape of hydraulic fluid through inlet and outlet lines 70,72 of the torque converter.

In order for the combined electromagnetic structure 33 to operate in the starting mode, external AC power may be supplied through the contactor B1 and the bridge rectifier 50 or DC power may be supplied through the contactor C1. When a signal is transmitted over the line 66 to cause the GCU to command the starting mode, either contactor B1 or contactor C1 is closed to connect the external power to the inverter 54. The inverter 54 is enabled by the GCU 34 at this time and contactor D2 is closed so that the inverter output is applied to the stator of the PMG 32. The inverter 54 develops a constant volt second/cycle waveform to operate the PMG as a motor. At this time, the GCU 34 empties the torque converter 22 to decouple the prime mover from the PMG 32. The PMG 32 drives the common rotor 29 at increasing speeds.

When the combined common rotor 29 reaches a speed which permits commutation of SCR switches in the motor control circuit 56 by the back electromagnetic force of the generator 20, the inverter 54 is disconnected from the PMG 32 by opening the contactor D2 and the contactor A2 is closed to cause the generator stator windings to receive power from the motor control circuit 56. The power from the motor control circuit 56 causes the main machine 20 to act as a synchronous motor. The torque converter is then commanded to fill with oil and allow motive power to be transferred from the electromagnetic structure 33 to the prime mover 24.

Once the prime mover 24 has been started, it drives the generator 20 by overrunning the torque converter 22. This condition is sensed by a prime mover speed sensor 74, which in turn causes the GCU 34 to initiate the generating mode. This is accomplished by closing the contactors A1, C2, D1 and D3.

Figure 3:
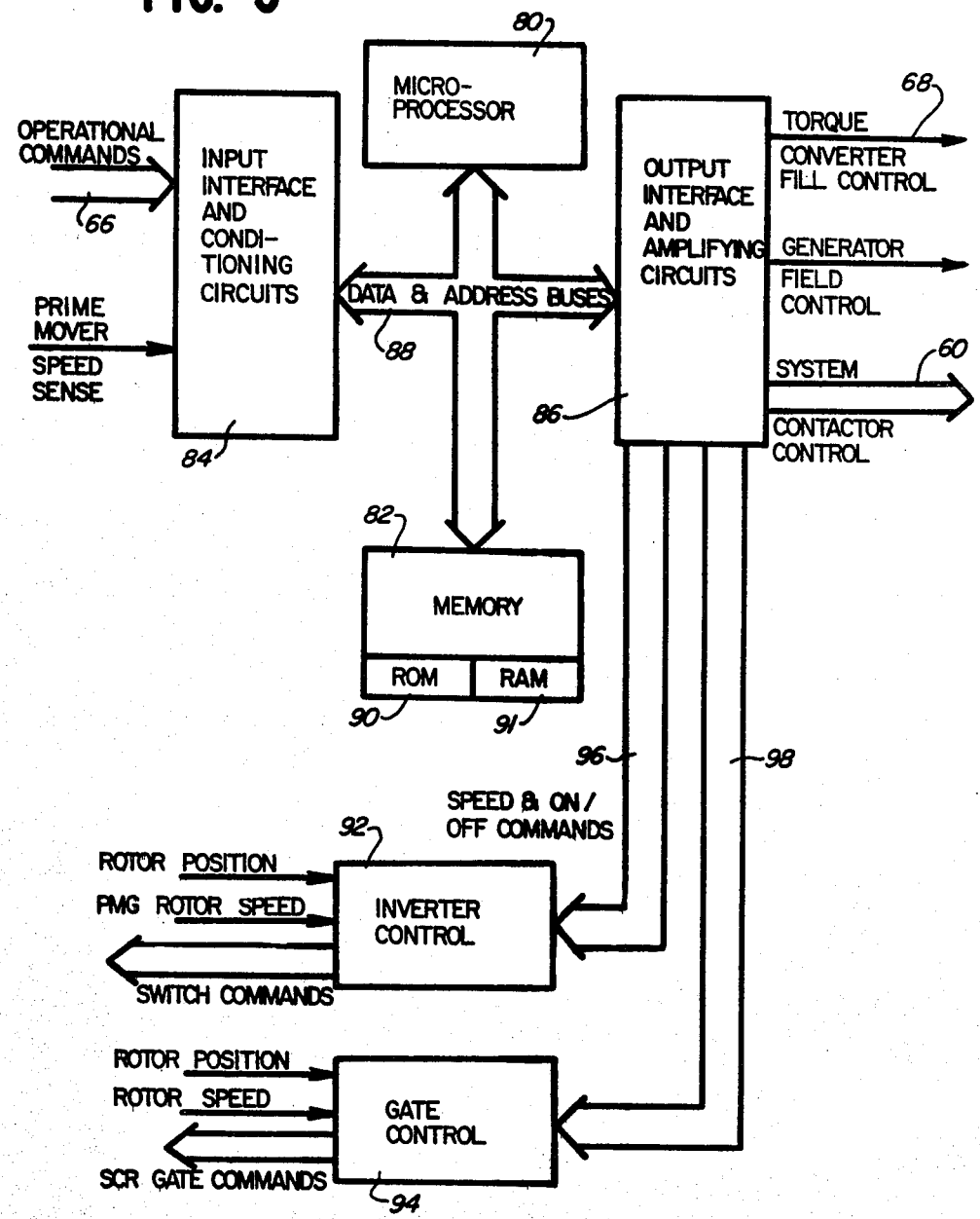
FIG. 3 is a block diagram of the generator control unit, or GCU shown in FIG. 1.

Referring now to FIG. 3, there is illustrated in block diagram form the GCU 34 shown in FIG. 1. The GCU 34 includes a general purpose microprocessor 80 which communicates with a memory 82 and input and output circuits 84,86, respectively, over data and address buses 88. The memory 82 includes a read only memory, or ROM 90 which stores the control program and constants used during the course of the control program. The memory 82 also includes a random access memory, or RAM 91 which stores various intermediate results, flags and timers used during the control program.

The input circuits 84 interface between the buses 88 and the input signals. The input signals include the operational commands over the line 66 and the output from the prime mover speed sensor 74. Other inputs not essential to a full and complete understanding of the present invention are not shown for the sake of clarity.

The output circuits 86 interface between the buses 88 and various outputs, such as the torque converter fill control over the line 68, the generator field control from the rectifier circuit 38 in the GCU 34 and the contactor control over the lines 60.

Additional outputs from the output circuit 68 include speed and on/off command signals for operating an inverter control 92 and a gate control 94.

The inverter control 92 and gate control 94 receive signals representing rotor position and speed of the combined electromagnetic structure 33 from the MPU 58 shown in FIG. 2. The controls 92,94 are conventional and develop switching signals for switches in the inverter 54 and motor control 56 based upon the command signals over lines 96,98 and the signals from the MPU 58.

Figure 4:
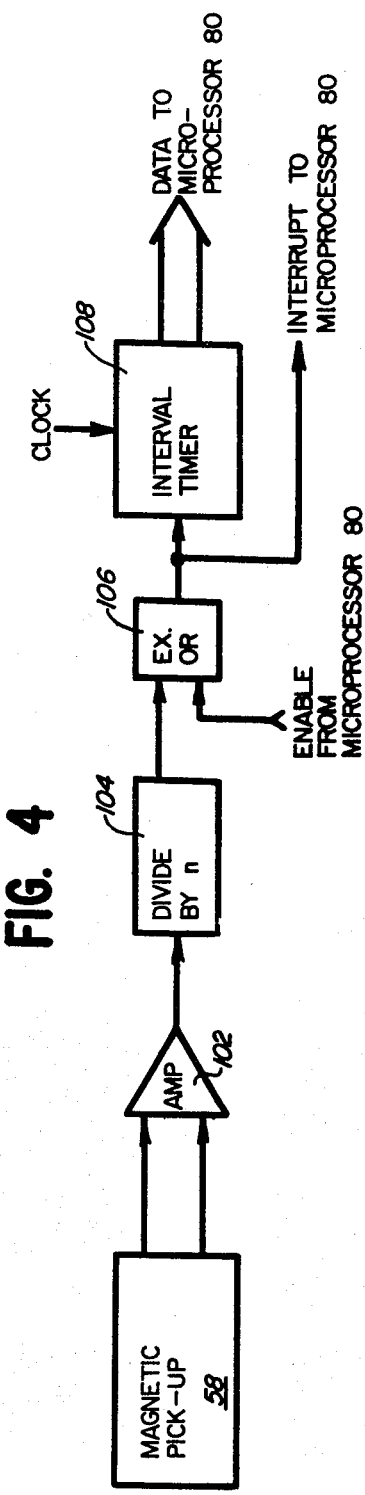
FIG. 4 is a block diagram of speed-detecting circuitry.
Figure 5:
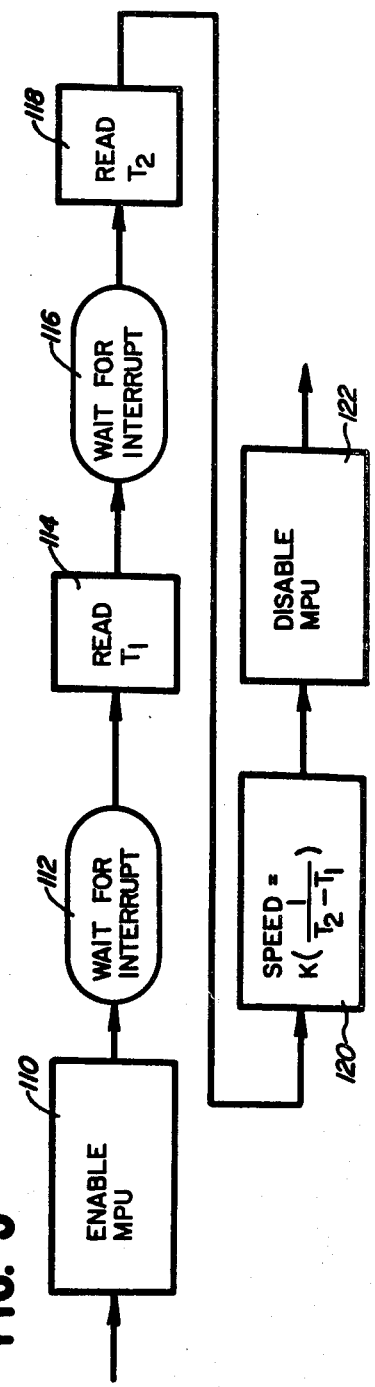
FIG. 5 is a flow diagram of programming in the GCU of FIG. 1 which, in conjunction with the circuitry of FIG. 4, determines the speed of the main machine.

Referring now to FIGS. 4 and 5, there is illustrated means for deriving an indication of rotor speed as seen in FIG. 4, the signal from the MPU 58 is amplified by an amplifier 102 and the frequency of the output pulses is reduced by a divide-by-n circuit 104.

The signal from the divide-by-n circuit 104 is gated by an enable signal from the microprocessor 80 in an exclusive OR gate 106. The gate 106 develops an interrupt signal which is coupled over one of the buses 88 to the microprocessor 80. The length of time between consecutive pulses in the signal from the gate 106 is timed by an interval timer 108 and this information is also coupled over one of the buses 88 to the microprocessor 80.

Referring now to FIG. 5, programming in the microprocessor 80 determines the speed of the common rotor 29 from the signals developed by the circuitry of FIG. 4. A block 110 generates the enable signal which is coupled to the exclusive OR gate 106, FIG. 4, to enable the MPU 58. When the next interrupt is generated from the gate 106, a block 114 reads the length of time $T_1$ between consecutive pulses from the gate 106 as determined by the timer 108.

When the next interrupt is generated a block 118 reads the next duration of time $T_2$ between consecutive pulses from the OR gate 106. A block 120 then computes the speed based upon the durations between successive pairs of pulses according to the equation $$\text{Speed} = K\left(\frac{1}{T_2 - T_1}\right)$$

where K is a constant.

The MPU is then disabled until the next speed sensing function is initiated.

Figure 6A:
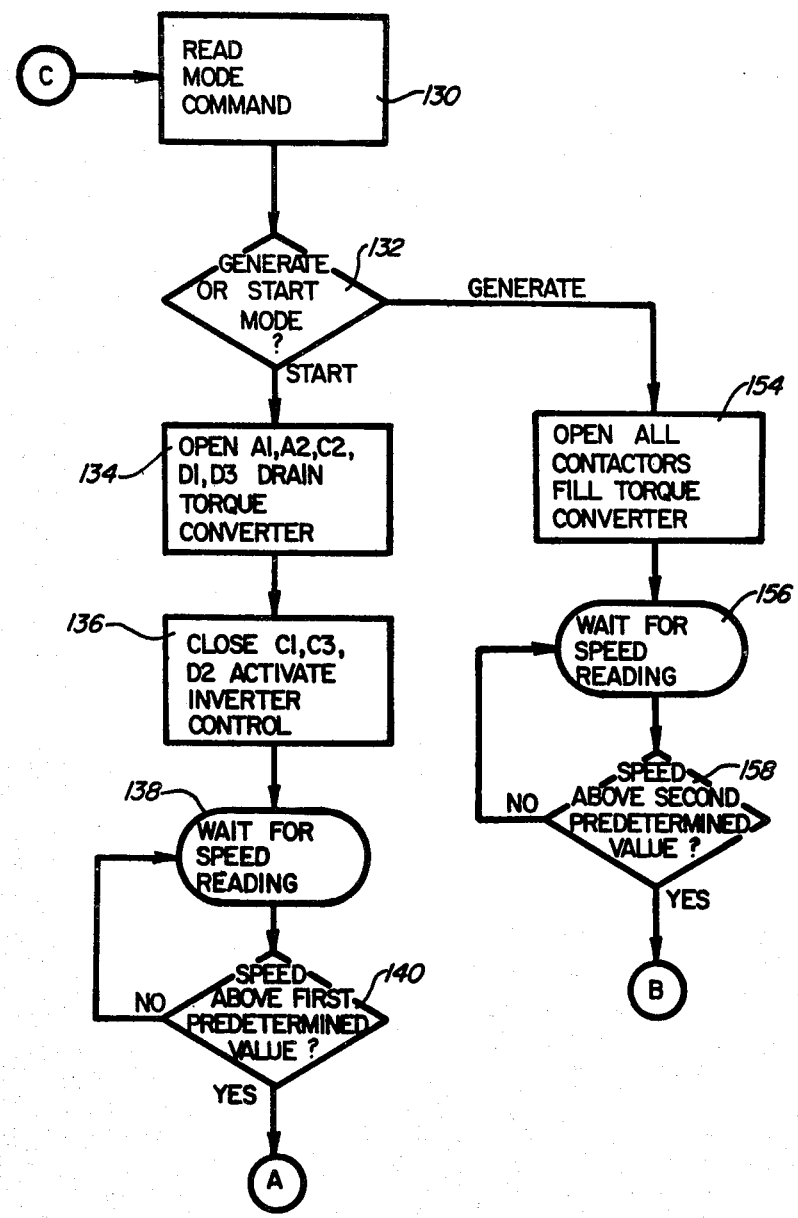
FIGS. 6A and 6B, when joined along similarly lettered lines, together comprise a single flow chart of programming in the GCU for controlling the start and generating modes for the system shown in FIG. 1.
Figure 6B:
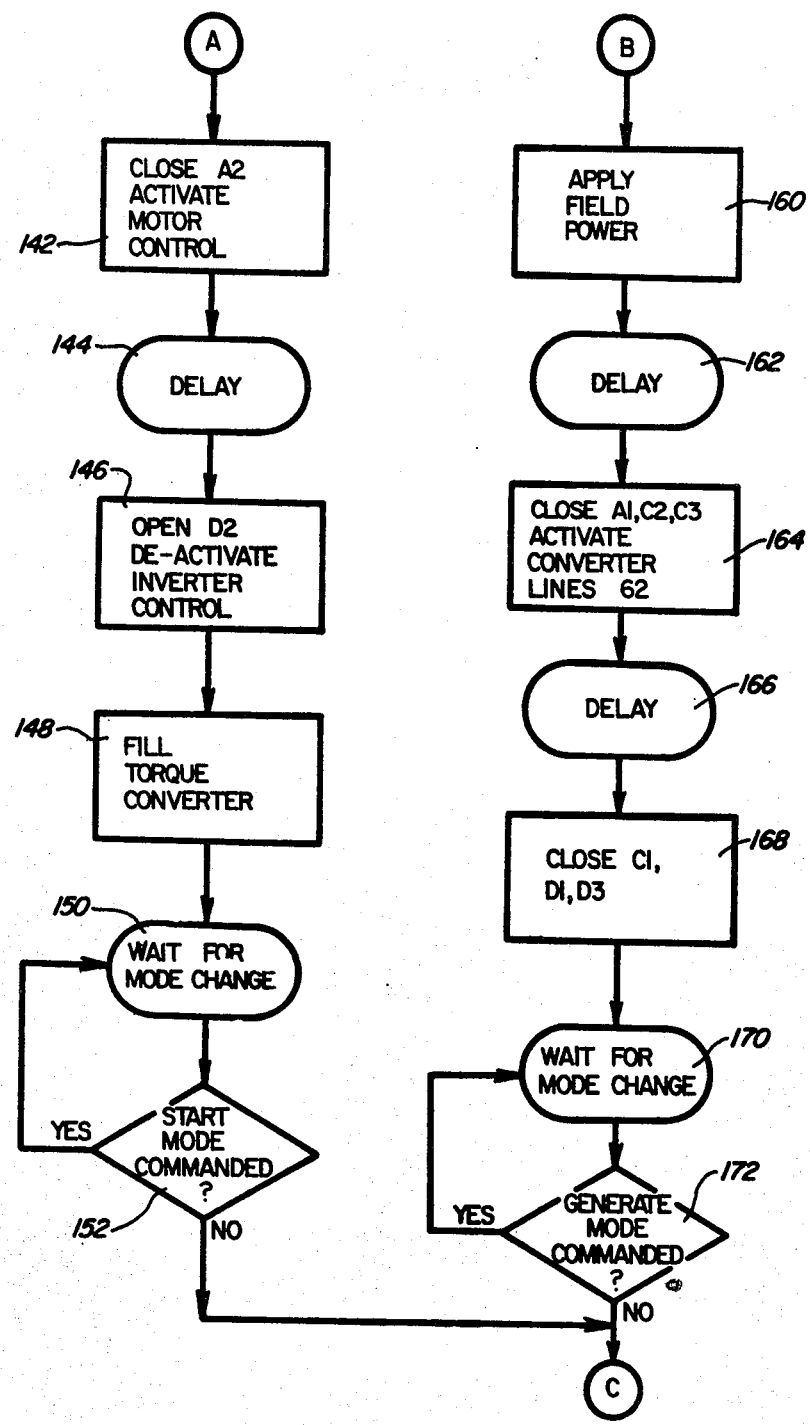

Referring now to FIGS. 6A and 6B, there is illustrated the programming contained in the ROM 90 of the GCU to control the operational mode of the combined electromagnetic structure 33.

The control begins at a block 130 which senses the mode command on the line 66, FIG. 1. A block 132 then determines whether the generate or start mode has been commanded.

If the block 132 determines that the start mode has been commanded, a block 134 opens the contactors A1, A2, C2, D1 and D3 and the torque converter is drained so that the combined electromagnetic structure 33 is not loaded by the torque converter and prime mover 24.

A block 136 then closes the contactors C1, C3 and D2 so that external power applied to the line 53 is coupled to the inverter 54 and the output of the inverter 54 is coupled to the stator of the PMG 32. The block 136 also actuates the inverter control 92 shown in FIG. 3 so that AC power is delivered to the PMG 32.

It should be noted in the event that external power is coupled through the bridge rectifier 50, the contactor B1 is closed rather than the contactor C1 by the block 136.

The inverter 54 supplies a constant volt second/cycle waveform with current limiting to operate the PMG as a motor. The output of the inverter 54 is a variable frequency/variable voltage waveform which is timed by the GCU as a function of the rotor position so that the PMG supplies maximum torque to the common rotor. It should be noted in this regard that the PMG 32 should be larger than would be necessary were it to be used only to provide field current for the exciter 30 so that sufficient torque can be generated to drive the common rotor 29.

The speed of the rotor is then determined as noted in connection with FIGS. 4 and 5 and control pauses until the speed of the rotor exceeds a first predetermined value. This value is a speed at which the SCR's in the motor control can be commutated by the back EMF of the generator 20, and may be, for example, the speed at which the generator develops 270 volts zero-to-peak back EMF. Once this level is achieved, a block 142, FIG. 6B, closes the contactor A2 and actuates the motor control 56 so that the generator stator 44 receives power from the motor control 56. As previously mentioned, SCR's in the motor control are operated by the gate control 94 shown in FIG. 3.

A delay is then interposed in the control process by a block 144, following which a block 146 opens the contactor D2 and disables the inverter control 92 so that power is no longer supplied to the PMG 32 by the inverter 54. At this time, the main machine 20 is operated as a synchronous motor. A block 148 issues a command signal over the line 68 to cause the torque converter to fill with oil and transfer motive power to the prime mover 24. The prime mover is subsequently brought up to starting speed by the combined electromagnetic structure 33.

Once the prime mover has been started and has achieved operating speed, the prime mover drives the combined electromagnetic structure 33 overrunning the torque converter 22. At this point, an external control or a user may command the generating mode over the command line 66, FIG. 1. Control then branches through the blocks 130,132 to a block 154, FIG. 6A.

The block 154 opens all contactors and redundantly issues a command to the torque converter to fill with oil. Control then pauses at a block 156 which senses the speed of the common rotor 29. A block 158 then determines whether the speed is above a second predetermined level or value. This second predetermined value is the speed at which it can be assumed that the prime mover 24 is driving the generator 20, and not vice versa. It is necessary to make this determination since the branching to the block 154 from the block 152 may have been due to an external start mode command which was initiated prior to the time that the prime mover 24 was overrunning the torque converter 22. Accordingly, this block insures that the voltage regulator 38 remains disabled until the second level is reached.

Once the speed of the common rotor has risen above the second predetermined level or value, a block 160 enables or actuates the voltage regulator 38 in the GCU so that DC power is provided to the stator windings of the exciter 30. A delay is imposed by a block 162 to permit the generator output to stabilize.

A block 164 then closes the contactors A1, C2 and C3 and enables the DC-to-DC converter 52 and the inverter 54. A delay is then imposed by a block 166 to allow transients caused by actuation of the converter 52 and inverter 54 to die out.

A block 168 then closes the contactors C1, D1 and D3 so that DC and AC power is provided to energize appropriate output devices. Control then cycles through a pair of blocks 170,172 until a mode change is commanded.

Referring now to FIGS. 7 and 8, there is illustrated a modification of the embodiment shown in FIG. 1 wherein the exciter is replaced by a rotating transformer and rectifier circuit 180 which provides main field current for the generator 30. Elements common to FIGS. 1 and 7 are assigned like reference numerals.

Output AC power from the inverter 54 is coupled to a rectifier 182, FIG. 7, and the resulting DC power is connected to a mid-tap of a primary winding 184, FIG. 8, of the rotating transformer 180. The ends of the primary winding of the rotating transformer 180 are connected to first and second transistors Q1,Q2 which are in turn operated by pulse width modulation, or PWM logic 186. The transistors Q1,Q2 are alternately operated to connect the ends of the transformer primary 184 to ground. This transistor operation results in an alternating magnetic field in the transformer, in turn causing an alternating current to appear in a second winding 186 of the transformer 180. The alternating current is rectified in a rectifier circuit 188 and is supplied to the main generator field winding shown in FIG. 2.

The PWM logic operates at high frequency to allow the rotating transformer to be of small size. The amount of power delivered to the field winding, and hence the generator output voltage, may be controlled by modulating the duty cycles of the transistors. The PWM logic may receive a field command signal from the GCU over the converter control lines 62 to regulate generator output voltage.

We claim:

1. In a power conversion system operable in either a starting mode wherein the conversion system converts electrical power into motive power to start a prime mover or in a generating mode wherein the conversion system develops electrical power from motive power supplied by the prime mover including a main dynamoelectric machine, means actuable to supply field current to the main machine including a permanent magnet generator, or PMG, the main machine and PMG having a common rotor, and a torque converter operable to transfer power between the prime mover and the common rotor, a control for operating the conversion system in the starting mode, comprising:
 a source of electrical power;
 means for coupling the source of electrical power to the PMG when the conversion system is operated in the starting mode to cause the PMG to operate as a motor and drive the common rotor;
 means coupled to the main machine for applying electrical power thereto to cause the main machine to operate as a synchronous motor when a predetermined operating condition of the main machine is attained;
 means for disconnecting the source of electrical power from the PMG after the predetermined operating condition is attained; and
 means coupled to the torque converter and responsive to an operating parameter of the main machine for controlling the torque converter including means for disabling the torque converter to decouple the main machine from the prime mover until the predetermined operating condition is attained and means for enabling the torque converter to couple the main machine to the prime mover to start the latter when the main machine is operated as the synchronous motor.

2. The control of claim 1, wherein the applying means includes means for sensing the speed of the common rotor and means for determining whether the speed of the common rotor has reached a first predetermined value.

3. The control of claim 2, wherein the speed sensing means includes a magnetic pick up, or MPU which develops pulses representing the rotation of the common rotor and means coupled to the MPU for deriving an indication of rotor speed from the MPU pulses.

4. The control of claim 3, wherein the deriving means includes means for indicating the length of time between successive MPU pulses.

5. The control of claim 4, wherein the deriving means further includes means coupled to the indicating means for computing rotor speed from successive indicated lengths of time.

6. The control of claim 4, wherein the deriving means further includes means coupled to the indicating means for computing rotor speed according to the equation $$\text{Speed} = K\left(\frac{1}{T_2 - T_1}\right)$$

where:
 K is a constant;
 $T_1$ is the length of time between a first pair of successive MPU pulses; and
 $T_2$ is the length of time between a second pair of successive MPU pulses.

7. The control of claim 1, further including means for selecting either the generating or starting modes of operation and means for initiating the generating mode when such mode is selected and the prime mover has started.

8. The control of claim 7, wherein the generating mode initiating means includes means for determining whether the speed of the common rotor has reached a second predetermined level and means for actuating the field current supply means after the second predetermined level is reached.

9. In a power conversion system selectively operable in either a starting mode wherein the conversion system converts electrical power into motive power to start a prime mover or in a generating mode wherein the conversion system develops electrical power from motive power supplied by the prime mover including a synchronous main dynamoelectric machine, means for providing field current to the main machine including a permanent magnet generator, or PMG, the main machine and PMG having a common rotor and a torque converter selectively actuable to transfer motive power between the prime mover and the common rotor, a control system for operating the conversion system, comprising:

means for selecting either the generating or starting modes of operation;

a source of electrical power; and a control unit coupled to the selecting means and to the torque converter for operating the system in the selected mode, the control unit further including means for coupling the source of electrical power to the PMG to operate it as a motor to drive the common rotor when the starting mode is selected, means for deactuating the torque converter to allow the common rotor to rotate at increasing speeds in an unloaded condition, means for sensing the speed of the common rotor, means for applying electrical power to the main machine to operate it as a synchronous motor when the common rotor reaches a first predetermined level, means for disconnecting the source of electrical power from the PMG after the first predetermined level is reached and means for actuating the torque converter to cause motive power to be transferred from the main machine to the prime mover to start same when the main machine is operated as a synchronous motor.

10. The control system of claim 9, wherein the rotor speed sensing means includes a magnetic pick up, or MPU which develops output pulses in response to rotation of the common rotor, means for indicating the length of time between successive pulses and means for deriving an indication of rotor speed from the indicated length of time.

11. The control system of claim 10, wherein the deriving means includes means for computing the speed of the common rotor according to the equation $$\text{Speed} = K\left(\frac{1}{T_2 - T_1}\right)$$

where:
K is a constant;
$T_1$ is the length of time between a first pair of successive MPU pulses; and
$T_2$ is the length of time between a second pair of successive MPU pulses.

12. The control system of claim 9, wherein the means for providing field current includes an exciter and wherein the control unit includes a voltage regulator coupled between the PMG and the exciter operable to deliver regulated voltage to the exciter and means for initiating the generating mode when such mode is selected and the prime mover has started including means for operating the voltage regulator whereby field current is delivered to the main machine so that the main machine develops electrical power.

13. The control system of claim 12, wherein the generating mode initiating means includes means for determining whether the speed of the common rotor has reached a second predetermined level and means for preventing operation of the voltage regulator until the second predetermined level is reached.

14. In a control process for a power conversion system operable in either a starting mode wherein the conversion system converts electrical power into motive power to start a prime mover or in a generating mode wherein the conversion system develops electrical power from motive power supplied by the prime mover including a main dynamoelectric machine, means actuable to supply field current to the main machine including a permanent magnet generator, or PMG, the main machine and PMG having a common rotor, and a torque converter operable to transfer power between the prime mover and the common rotor, an improved method of operating the conversion system in the starting mode, the method comprising:

disabling the torque converter to decouple the main machine from the prime mover;

coupling a source of electrical power to the PMG when the conversion system is operated in the starting mode to cause the PMG to operate as a motor and drive the common rotor;

applying electrical power to the main machine to cause the main machine to operate as a synchronous motor when the speed of the common rotor has reached a predetermined level;

disconnecting the source of electrical power from the PMG after the speed of the common rotor has reached the predetermined level; and enabling the torque converter to cause motive power to be transferred from the main machine to the prime mover to start the latter when the main machine is operated as a synchronous motor.

* * * * *